Feb. 15, 1966 K. C. TAYLOR 3,235,243
APPARATUS FOR PRODUCING ULTRACLEAN ALLOY STEELS
Filed Sept. 12, 1963 2 Sheets-Sheet 1

INVENTOR.
KENDRICK C. TAYLOR
BY Arthur H. Seidel
ATTORNEY

Feb. 15, 1966     K. C. TAYLOR     3,235,243
APPARATUS FOR PRODUCING ULTRACLEAN ALLOY STEELS
Filed Sept. 12, 1963     2 Sheets-Sheet 2

INVENTOR.
KENDRICK C. TAYLOR
BY Arthur H. Seidel
ATTORNEY

United States Patent Office 3,235,243
Patented Feb. 15, 1966

3,235,243
APPARATUS FOR PRODUCING ULTRACLEAN ALLOY STEELS
Kendrick C. Taylor, Oreland, Pa., assignor, by mesne assignments, to Pennsalt Chemicals Corporation, Philadelphia, Pa., a corporation of Pennsylvania
Filed Sept. 12, 1963, Ser. No. 308,551
13 Claims. (Cl. 266—34)

This application is a continuation-in-part of my copending application Serial No. 210,643, filed July 18, 1962, now U.S. Patent No. 3,180,633, granted April 27, 1965.

In general, this invention relates to new and improved apparatus for producing ultraclean alloy steels. More particularly, it relates to the production of ultraclean alloy steels utilizing magnetic mixing in a vacuum chamber and introducing heat into the steel for better alloying and degassing.

In the production of various grades of steel manufactured from processes which are conventional, there is a need to produce ultraclean steel whose gas content approaches the very low levels obtained by consumable arc or induction melting. Additionally, there is a large need for a dynamic mixing process which will insure greater shipped tonnage from the same melting output. Steel billets with these advantages must be capable of being produced in existing melting departments of steel mills from the equipment on hand with only minor changes in regard to the ladles which will be used and the method of using the ladles.

The present invention contemplates the addition to the present melting facilities in large steel mills of an inexpensive vacuum chamber capable of reducing the hydrogen content, the nitrogen content and the oxygen content in steel. This simple addition will enable the steel manufacturers to produce steel of greater ductility and cleanliness. The present invention contemplates stream degassing as well as area degassing. With a ladle of molten steel disposed within a vacuum chamber, mixing of the molten steel and introducing heat into the molten steel is accomplished by means of an induction coil which is disposed within the walls of the ladle. The induction coil is of a type operating on line frequency or harmonics thereof. The heat introduced into molten steel from the induction coil prevents losses to the environment and accounts for minor correction to maintain the temperature of the molten bath by varying the power input to the coil. The ladle is preferably one which is provided with means for removing the molten bath from the ladle such as by a discharge port adjacent a bottom wall of the ladle or by providing a lip on the ladle.

The ladle in addition to having its own induction coil, is composed of easily separable parts whereby the coil and the refractory portion may be readily replaced. The ladle is of a type which may be utilized with existing equipment and easily moved into and out of the vacuum chamber. In the absence of coupling of electric power to the induction coil, the ladle may be utilized to perform the conventional functions of ladles well known to those skilled in the art.

It is a general object of the present invention to provide a novel apparatus for producing ultraclean alloy steels.

It is another object of the present invention to provide apparatus for degassing molten metals wherein a ladle for the molten metal is provided with an induction coil operable on line frequency for stirring the molten metal and introducing heat into the molten metal while it is disposed within the ladle.

It is another object of the present invention to provide a novel ladle for molten metal.

It is another object of the present invention to provide novel molten metal handling apparatus and means for transferring the molten metal from the apparatus.

It is another object of the present invention to provide apparatus wherein a more complete alloying of molten metal may be accomplished with improved degassing and temperature maintenance.

It is another object of the present invention to provide apparatus for degassing molten metals utilizing magnetic stirring and simultaneous introduction of heat into the molten metal.

Other objects will appear hereinafter.

For the purpose of illustrating the invention, there are shown in the drawings forms which are presently preferred; it being understood, however, that this invention is not limited to the precise arrangements and instrumentalities shown.

Figure 1:
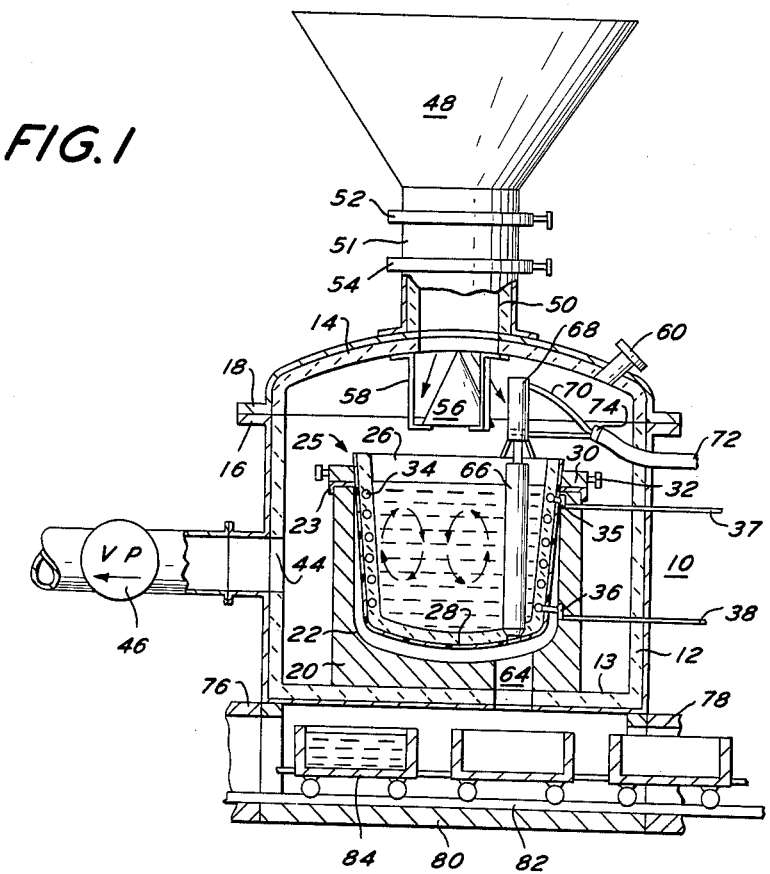
FIGURE 1 is a partial sectional view of a preferred embodiment of the present invention.

Referring to the drawing in detail, wherein like numerals indicate like elements, there is shown in FIGURE 1 a vacuum chamber generally designated by the numeral 10.

The vacuum chamber 10 includes a bottom receiving housing 12 having a metal shell therearound. The housing 12 has a bottom wall 13 and a cover 14. The cover 14 is provided with an annular flange 18 adapted to cooperate with flange 16 on the housing 12 with a seal therebetween.

A non-magnetic ladle receiving stand 20 is mounted on the floor 13 of the housing 12. The stand 20 has a ladle-shaped cavity 22. The upper edge of the stand 20 is provided with a support ring 23.

A ladle 25 is supported on the ring 23 and extends into the cavity 22. Ladle 25 includes a refractory lining 26 having a non-magnetic outer shell 28 which is preferably made from reinforced fiberglass such as Spiralloy. The refractory liner 26 is not physically bonded or joined to the shell 28. The shell 28 is secured to an annular ring 30 having an inner diameter which is less than the outer diameter at the upper end of the refractory liner 26 and shell 28. A pair of lifting lugs 32 are provided at diametrically opposite points on the ring 30.

The refractory liner 26 includes as an integral part thereof an induction coil 34 operable on line frequency or harmonics thereof. Opposite ends of the coil 34 are electrically coupled to contacts 35 and 36 on the stand 20. The contacts 35 and 36 are coupled to electrical cables 37 and 38.

The molten metal in the ladle 25 may be placed therein by conventional equipment, i.e. filled at a melting furnace and transported by overhead crane, prior to placing the ladle within the vacuum chamber 10. Alternatively, the molten metal may have been stream degassed into the ladle 25 while the same is disposed within the chamber 10. Alloying materials may be added to the molten metal in the ladle 25 from the hopper 48 in one or several sequences to effect successive alloying or deoxidation. The hopper 48 may be supported by the cover 14 having an inlet port 50. Control of the feeding of alloying materials may be effected by a trap chamber 51 located between adjacent valves 52 and 54. The trap chamber 51 is operated by first opening valve 52 to allow an adjustable or predetermined amount of alloying material thereinto.

Thereafter, valve 52 is closed and valve 54 is opened to feed the material to the molten metal in the ladle 25.

A conical baffle 56 may be supported by frames 58 immediately below the trap chamber 51. The baffle 56 is effective to insure the flow of alloying material to the side walls of the ladle 25 for reasons which will be discussed hereinafter.

The roof 14 is provided with a sight port 60 so that the magnetic stirring of the molten metal may be observed as well as the introduction of alloying materials. The stand 20 is provided with an aperture therethrough in line with an aperture in the bottom wall 13 of the housing 12. An aperture is provided in the ladle 25 in line with the aperture 64. The aperture in the ladle 25 is selectively opened and closed by means of a stopper rod 66 having a reduced diameter portion on its upper end connected to a piston within cylinder 68. Conduits 70 supply motive fluid to opposite ends of cylinder 68. Cylinder 68 is supported in a removable manner by the ring 30. The conduits 70 are connected to a conduit cable 72 by coupling 74.

Below the bottom wall 13 of the housing 12, there is a floor 80 and extensions 76 and 78 extending in opposite directions away from the vacuum chamber 10. Extensions 76 and 78 are evacuated and may have trap chambers so that wheel mounted molds 84 may be moved along track 82 to a position where they may receive molten metal discharged from the ladle 25.

The operation of the apparatus illustrated in FIGURE 1 is as follows:

The cover 14 and its associated elements may be raised a short distance by an overhead crane (not shown) and moved to one side exposing the top of the housing 12. Thereafter, a crane or the like (not shown) supporting the ladle 25 may be moved to a position wherein the ladle 25 will be lowered to the position illustrated in FIGURE 1. When the ladle 25 is so positioned, the coil 34 will be coupled to the contacts 35 and 36. Thereafter, coupling 74 is effectuated so that motive fluid may be supplied into the cylinder 68. The cover 14 is then returned to the position illustrated.

Vacuum pump 46 will then evacuate the chamber 10. The energized coil 34 which is coupled to alternating line current whose frequency is 50 or 60 cycles per second develops a confined magnetic field which passes almost exclusively through the molten metal as it is the only ferromagnetic material in the area immediately adjacent the coil. Thus, the molten metal is stirred as illustrated by the arrows in FIGURE 1. Simultaneously, the line current will result in the introduction of heat into the molten metal to prevent losses, melt alloy additions, and maintain a proper temperature for the molten metal. In order that the stopper rod 66 not interfere with the magnetic stirring, it is made from a heat resistant non-magnetic material such as stainless steel. The coil 34 does not require continuous liquid cooling. At most, the coil will require intermittent gas or water cooling.

As the molten metal is moved from the outer walls toward the center or vice versa, the surface area of the metal is continuously moving. As the surface area of the molten metal changes, it is degassed by the vacuum in chamber 10. After the molten metal has been degassed, and any alloying materials introduced as desired, it will be noted that the alloying materials are directed toward the inner surface of the ladle 25. Accordingly, the alloying materials will be circulated throughout the molten material to effect a homogeneous alloy. Thereafter, motive fluid may be supplied through the conduits 70 to the cylinder 68 to raise the stopper rod and permit selective discharge of the molten metal through aperture 64 into the molds 84. The molds 84 may be periodically moved so as to place a new mold below the aperture 64 as desired.

Figure 2:
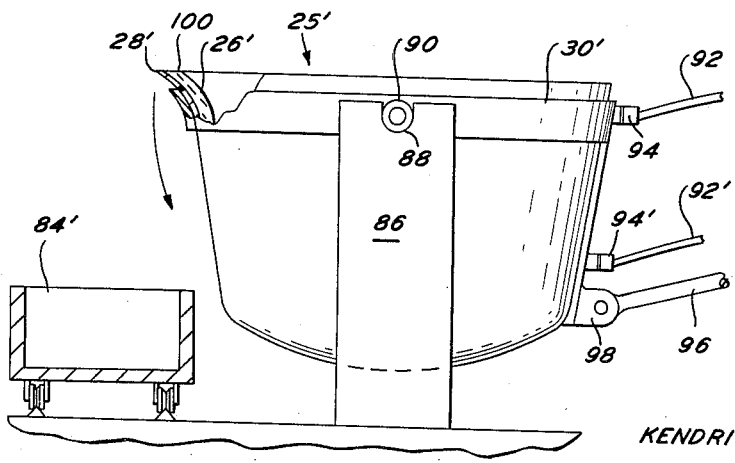
FIGURE 2 is a partial elevation view illustrating another embodiment of a ladle which may be utilized in the apparatus illustrated in FIGURE 1.

In FIGURE 2, there is illustrated another embodiment of components described above. Thus, the ladle 25 and its stand 20 may be replaced by the structure illustrated in FIGURE 2 when lip pouring is desired. Hence, ladle 25' is identical with ladle 25 except as will be made clear hereinafter.

In FIGURE 2, the ladle 25' is supported by a stand composed of upright support pillars 86 having a U-shaped notch 88 on the upper surface thereof. The trunnions 90 of the ladle 25 stem from diametrically opposite points on the ring 30' and are supported by the notch 88. Ladle 25' is provided with a refractory liner 26' having a coil corresponding to coil 34. The ring 30' is connected to a shell 28' corresponding identically with shell 28.

Each of the electrical cables 92 and 92' are electrically coupled to the coil in the liner 26' by way of couplings 94 and 94'. Couplings 94 and 94' are readily separable. An actuating rod 96 is removably coupled to a bifurcated yoke 98 for selective lip pouring of the molten metal from lip 100 into the wheel mounted molds 84'. Otherwise, the apparatus illustrated in FIGURE 2 will be disposed within the vacuum chamber 10 and operated in the manner described above.

Figure 3:
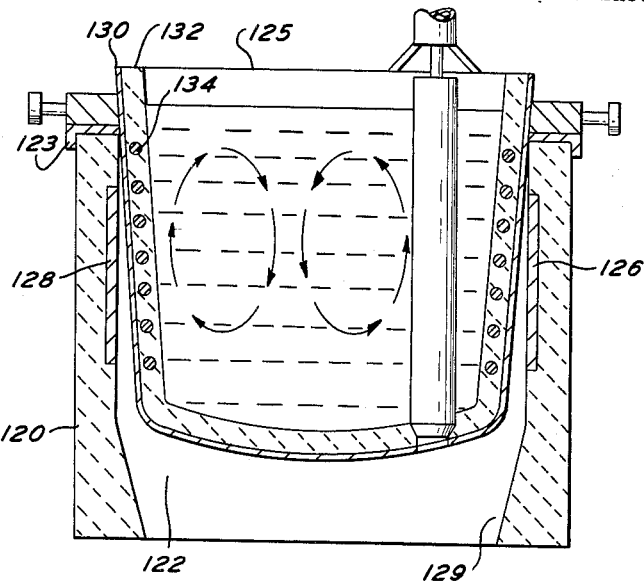
FIGURE 3 is a partial sectional view of a third embodiment of the present invention.

In FIGURE 3 there is illustrated a third embodiment of components described above. Thus, the ladle 125 shown in FIGURE 3 is identical with ladle 25 of FIGURE 1. However, the stand 120 shown in FIGURE 3 replaces the stand 20 of FIGURE 1 when high currents are supplied to the coil 134. The stand 120 is identical with stand 20 except as will be made clear hereinafter.

In FIGURE 3, the stand 120 is manufactured of a refractory material and has a ladle-shaped cavity 122. The upper edge of the stand 120 is provided with a support ring 123 for supporting the ladle 125. The ladle 125 extends into the cavity 122. Along the inner surface of the cavity 122 there are provided a plurality of magnetic shunts 126 and 128 spaced about the periphery of the cavity 122 and extending approximately the height of and positioned adjacent the coil 134 of the ladle 125. The stand 120 has an open bottom 129 rather than the closed bottoms as has been shown in the embodiments of FIGURES 1 and 2. The open bottom avoids damming of molten steel in the cavity 122 in case of a leaky stopper in the ladle 125.

When high currents are fed to the coil 134, the magnetic flux without the coil tends to induce currents in equipment in the steel mill adjacent the vacuum chamber of the present invention and has other deleterious effects. By providing a return path for the magnetic flux induced by the coil 134 outside of the coil, this magnetic flux is concentrated in the magnetic shunt paths 126 and 128 and will not cause the results discussed above. Since the ladle 125 has a non-magnetic outer shell 130 and a refractory liner 132 the air gap between the coil 134 and the shunts 128 and 126 will not prevent these magnetic shunts from performing their duties. In all other ways, the apparatus of FIGURE 3 is operative in the same manner as the apparatus of FIGURE 1.

Figure 4:
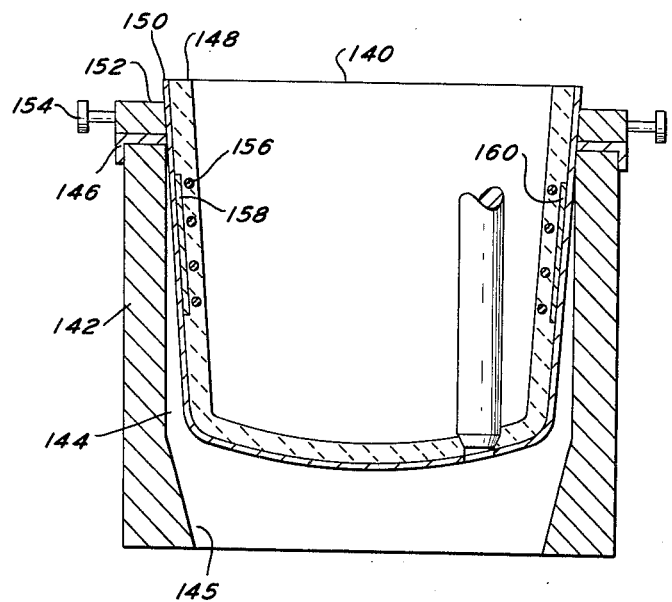
FIGURE 4 is a partial sectional view of still another embodiment of the present invention.

In FIGURE 4, there is shown still another embodiment of the present invention which performs the same function as the apparatus of FIGURE 3. That is, the apparatus of FIGURE 4 includes the ladle 140 which rests on a magnetic ladle receiving stand 142. The stand 142 has a ladle-shaped cavity 144 and an open bottom 145 for the reasons discussed with respect to the open bottom 129. The upper edge of the stand 142 is provided with a support ring 146.

The ladle 140 is supported on the support ring 146 and extends into the cavity 144. Ladle 140 includes a refractory liner 148 having an outer shell 150 manufactured of a mild carbon steel which, although having some magnetic properties, is not highly magnetic. The shell 150 is secured to an annular ring 152 having an inner diameter which is less than the outer diameter at the upper end of the shell 150. A pair of lifting lugs 154 are provided at diametrically opposite points on the ring 152.

The refractory liner 148 includes as an integral part thereof an induction coil 156 operable on line frequency or harmonics thereof. Opposite ends of the coil 156 are electrically coupled to suitable contacts on the stand 142 in the manner discussed with respect to the embodiment of FIGURE 1.

Adjacent the induction coil 156 and between the coil 156 and the shell 150 there are provided a plurality of magnetic shunts 158 and 160 which extend the length of the induction coil 156. These magnetic shunts 158 and 160 provide a suitable return path for the flux induced by the coil 156 which passes outside of the coil 156. By placing the magnetic shunts within the shell 150 and adjacent the coil 156, it is possible to manufacture the shell 150 of a magnetic material such as mild carbon steel which is considerably less expensive than a reinforced fiberglass (Spiralloy) or stainless steel shell. The magnetic shunts 158 and 160 perform the same function as the magnetic shunts 126 and 128 shown in FIGURE 3. By utilizing the magnetic shunts 158 and 160 within the shell 150, the stand 142 can be made of a magnetic material rather than the refractory material of the embodiments of FIGURES 1–3. A stand of magnetic material can be manufactured stronger and cheaper than a refractory stand.

The present invention may be embodied in other specific forms without departing from the spirit or essential attributes thereof and, accordingly, reference should be made to the appended claims, rather than to the foregoing specification as indicating the scope of the invention.

I claim:

1. Molten metal handling apparatus comprising a chamber, means for evacuating said chamber, a ladle in said chamber, a stand in said chamber, said ladle being removably supported by said stand, said chamber having an opening through which said ladle may be moved into and out of the chamber, means for simultaneously inducing circulation current in molten metal in the ladle and introducing heat into molten metal in the ladle when the ladle is disposed within said chamber, means for selectively discharging molten metal from the ladle while the ladle is disposed within said chamber, and said ladle including a fiberglass shell having a refractory liner disposed therewithin.

2. Molten metal handling apparatus comprising a chamber, means for evacuating said chamber, a ladle in said chamber, a stand in said chamber, said ladle being removably supported by said stand, such chamber having an opening through which said ladle may be moved into and out of the chamber, and means for simultaneously inducing circulation currents in molten metal in the ladle and introducing heat into molten metal in the ladle while the ladle is disposed within the chamber, said last-mentioned means including an induction coil supported by the ladle, magnetic shunts, said magnetic shunts being mounted outside said induction coil and extending the height of said induction coil to provide a return path for flux induced by said induction coil outside of said induction coil.

3. The apparatus of claim 10 wherein said stand has a ladle receiving cavity therein within which said ladle is removably supported, said magnetic shunts being mounted in said ladle receiving cavity and extending the height of said induction coil, said ladle being manufactured of a non-magnetic material.

4. The apparatus of claim 10 wherein said ladle includes an outside shell with a refractory liner therein, said induction coil being supported by said refractory liner, said magnetic shunts being mounted between said induction coil and said shell within said refractory liner and extending the height of said induction coil to provide a return path for flux induced in said induction coil.

5. The ladle of claim 4 including magnetic shunts mounted on said ladle outside of said coil, said magnetic shunts extending the height of said induction coil.

6. The ladle of claim 5 wherein said magnetic shunts are mounted in said refractory liner between said refractory liner and said shell, said shell being manufactured of a magnetic material, said shunts being manufactured of a highly magnetic material as compared to the magnetic material of said shell.

7. A ladle for handling molten metal comprising a heat-resistant shell, a refractory liner within said shell, an induction coil within said refractory liner, said coil being excited by alternating current having a frequency of about 50–60 cycles per second, means coupled to the shell for selectively lifting the shell and liner as a unit, and said heat-resistant shell being fiberglass.

8. A ladle for handling molten metal comprising a heat resistant substantially non-magnetic shell, a refractory liner within said shell, an induction coil within and supported by said refractory liner, said coil being excitable by alternating current having a frequency of about 60 cycles per second, means coupled to said shell for selectively facilitating the lifting of the shell and liner as a unit, and a pouring lip at the upper edge of said liner.

9. A ladle for handling molten metal comprising a heat resistant substantially non-magnetic shell, a refractory liner within said shell, an induction coil within and supported by said refractory liner, said coil being excitable by alternating current having a frequency of about 60 cycles per second, means coupled to said shell for selectively facilitating the lifting of the shell and liner as a unit, and said liner being freely supported by said shell so that the liner may be rapidly replaced.

10. Apparatus comprising a chamber, means for evacuating said chamber, a ladle stand in said chamber, a ladle in said chamber, said ladle including a non-magnetic shell, said ladle having a removable replaceable refractory liner, said liner containing induction coils for simultaneously inducing circulation currents in molten metal in the ladle and introducing heat into the molten metal in the ladle while the ladle is disposed within the chamber, lugs on opposite sides of said ladle adjacent the upper portion of the ladle, said ladle being supported on said stand by said lugs whereby the bottom of the ladle is unsupported, and means associated with said ladle for facilitating discharge of molten metal from the ladle while the ladle is disposed within the chamber.

11. Apparatus in accordance with claim 10 including a ring connected to the outer periphery of said shell adjacent the upper edge of said shell, the lugs being connected to said ring and extending in a radially outwardly direction from said ring.

12. Apparatus in accordance with claim 10 wherein said induction coils are excitable by alternating current having frequency of about 60 cycles per second.

13. Apparatus in accordance with claim 10 wherein said stand supports said shell and ladle for pivotable movement about an axis corresponding to the longitudinal axis of said lugs.

References Cited by the Examiner

UNITED STATES PATENTS

| 2,253,421 | 8/1941 | De Mare | 75—49 |
| 2,322,618 | 6/1943 | De Mare | 75—49 |
| 2,513,082 | 6/1950 | Dreyfus | 13—26 |

FOREIGN PATENTS

| 853,411 | 11/1960 | Great Britain. |
| 15,205 | 10/1960 | Japan. |

OTHER REFERENCES

Iron Age, July 4, 1963, pp. 90–91.

DAVID L. RECK, *Primary Examiner.*